US011511786B2

(12) United States Patent
Hammerbacher et al.

(10) Patent No.: US 11,511,786 B2
(45) Date of Patent: Nov. 29, 2022

(54) RATTLE NOISE REDUCING ELECTRIC POWER STEERING COLUMN ASSEMBLY AND METHOD

(71) Applicant: Steering Solutions IP Holding Corporation, Saginaw, MI (US)

(72) Inventors: David F. Hammerbacher, Saginaw, MI (US); John M. Andres, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 191 days.

(21) Appl. No.: 17/004,552

(22) Filed: Aug. 27, 2020

(65) Prior Publication Data
US 2021/0061339 A1    Mar. 4, 2021

Related U.S. Application Data

(60) Provisional application No. 62/895,724, filed on Sep. 4, 2019.

(51) Int. Cl.
*B62D 1/16* (2006.01)
*B62D 5/04* (2006.01)

(52) U.S. Cl.
CPC ...... *B62D 1/16* (2013.01); *B62D 5/04* (2013.01)

(58) Field of Classification Search
CPC ... B62D 1/16; B62D 1/20; B62D 5/04; B62D 6/10
See application file for complete search history.

(56) References Cited

U.S. PATENT DOCUMENTS

| 2002/0179361 A1* | 12/2002 | Ross ............ B62D 5/0409 180/443 |
| 2005/0218642 A1* | 10/2005 | Yamaguchi ....... F16F 15/10 280/779 |
| 2016/0146281 A1* | 5/2016 | Pattok ............ F16F 1/14 267/273 |

(Continued)

FOREIGN PATENT DOCUMENTS

| CN | 101054094 A | 10/2007 |
| CN | 101125557 A | 2/2008 |
| CN | 204452576 U | 7/2015 |

(Continued)

OTHER PUBLICATIONS

Office Action regarding corresponding DE App. No. 10 2020 122 909.7; dated Mar. 29, 2022.

(Continued)

*Primary Examiner* — James A English
*Assistant Examiner* — Scott F. Underwood
(74) *Attorney, Agent, or Firm* — Dickinson Wright PLLC

(57) ABSTRACT

An electric power steering assembly for a steering column includes a lower assist shaft defining a first bore. The assembly also includes a needle bearing at least partially disposed within the first bore. The assembly further includes an upper assist shaft assembly defining a second bore and having a journal surface at an end thereof. The assembly yet further includes a torsion bar having a first end disposed in the first bore and a second end disposed in the second bore, the torsion bar having a torsion bar run-out that forces the journal surface to remain in contact with an inner surface of the needle bearing.

18 Claims, 5 Drawing Sheets

(56) References Cited

U.S. PATENT DOCUMENTS

2016/0288816 A1* 10/2016 Kelly ........................ B62D 1/16
2017/0072988 A1* 3/2017 Strobel ................ B62D 5/0409

FOREIGN PATENT DOCUMENTS

| DE | 3321085 A1 * | 12/1983 | |
|----|----|----|----|
| DE | 10010837 A1 | 9/2001 | |
| DE | 102010055298 A1 | 6/2012 | |
| DE | 102011083807 A1 | 4/2013 | |
| DE | 102013111082 A1 | 4/2015 | |
| DE | 102014102807 B3 | 4/2015 | |
| EP | 1262392 A2 * | 12/2002 | ........... B62D 5/0409 |
| EP | 3536417 A1 * | 9/2019 | ................ B21J 5/12 |
| JP | 2002067994 A * | 3/2002 | |
| JP | 2010018056 A * | 1/2010 | |
| TW | M503355 U | 6/2015 | |
| WO | 03070542 A1 | 8/2003 | |

OTHER PUBLICATIONS

English translation of First Office Action regarding corresponding CN App. No. 2020109213210; dated Jun. 21, 2022.

\* cited by examiner

Vibration / Force Applied in Lateral Direction During Test

DETAIL B

US 11,511,786 B2

RATTLE NOISE REDUCING ELECTRIC POWER STEERING COLUMN ASSEMBLY AND METHOD

CROSS-REFERENCE TO RELATED APPLICATION

This application claims the benefit of priority to U.S. Provisional Patent Application Ser. No. 62/895,724, filed Sep. 4, 2019, the disclosure of which is incorporated by reference herein in its entirety.

BACKGROUND

The following description relates to steering column assemblies and, more particularly, to an electric power steering (EPS) column assembly and method that reduces rattle noise associated with operation.

Column located EPS systems often include an assist shaft assembly. The assist shaft assembly includes a lower assist shaft, a needle bearing, a torsion bar, and an upper assist shaft assembly. All of the above-mentioned components are held together—axially—by the interference fit between splined ends of the torsion bar and the bores in the lower assist shaft and the upper assist shaft assembly into which the ends of the torsion bar are pressed.

Rattle noise testing has revealed that the most important interface contributing to rattle noise in column EPS systems is the clearance between the needle bearing that is pressed into the lower assist shaft and a journal outer surface that is located at the bottom end of the upper assist shaft. Reducing the clearance to the low end of the tolerance can reduce the severity of rattle noise in some columns but not in others. Eliminating and reducing the clearance eliminates the rattle noise but is costly and negatively impacts (increases) hysteresis of the torque sensor due to the increase in friction of the bearing when there is little or no clearance between the journal and the needle bearing.

Another fix for this issue is to apply a grease with extremely high tackiness to the stop teeth of the upper assist shaft. The sticky grease acts to provide damping between the upper steering shaft assembly and lower assist shaft thereby reducing the velocity of motion, and impact strength, between the two shafts. The effectiveness of the grease is dependent on the amount of grease applied, and the quality of the distribution of the grease onto the stop teeth prior to assembly.

Other testing has shown that steering columns built with clearance between the journal and needle bearing that is at the upper end of the tolerance can also exhibit rattle noise in some columns, and not in others. Therefore, another feature within the column is impacting the propensity for the column, with clearance at the upper end of the tolerance, is causing the column to exhibit rattle.

SUMMARY OF THE DISCLOSURE

According to one aspect of the disclosure, an electric power steering assembly for a steering column includes a lower assist shaft defining a first bore. The assembly also includes a needle bearing at least partially disposed within the first bore. The assembly further includes an upper assist shaft assembly defining a second bore and having a journal surface at an end thereof. The assembly yet further includes a torsion bar having a first end disposed in the first bore and a second end disposed in the second bore, the torsion bar having a torsion bar run-out that forces the journal surface to remain in contact with an inner surface of the needle bearing.

According to another aspect of the disclosure, a steering column assembly includes a first shaft defining a first bore. The assembly also includes a second shaft defining a second bore, the second shaft having a journal surface at an end thereof, the first shaft and the second shaft in splined engagement with each other. The assembly further includes a bearing at least partially disposed within the first bore. The assembly yet further includes a torsion bar having a first end and a second end, the first end disposed in the first bore and fixed therein in splined engagement, the second end disposed in the second bore and fixed therein in splined engagement, the torsion bar having a torsion bar run-out that forces the journal surface to remain in contact with an inner surface of the bearing.

According to yet another aspect of the disclosure, a method of assembling an electric power steering assembly for a steering column is provided. The method includes inserting a needle bearing within a first bore of a lower assist shaft. The method also includes inserting a first end of a torsion bar into the first bore of the lower assist shaft. The method further includes inserting a second end of the torsion bar into a second bore of an upper assist shaft, the upper assist shaft having a journal surface located at an end thereof. The method yet further includes inserting the journal surface of the upper assist shaft into the first bore of the lower assist shaft and within an aperture of the needle bearing. The method also includes providing torsion bar run-out during rotation of the torsion bar that forces the journal surface to remain in contact with an inner surface of the needle bearing.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

DETAILED DESCRIPTION

Referring now to the Figures, where the invention will be described with reference to specific embodiments, without limiting same, a steering column electric power steering (EPS) assembly is illustrated and referenced with numeral 10. The EPS assembly 10 provides a low-cost solution to eliminating or reducing rattle noise associated with vibratory forces imposed on the EPS assembly 10 during operation of a vehicle it is assembled within.

Figure 1:
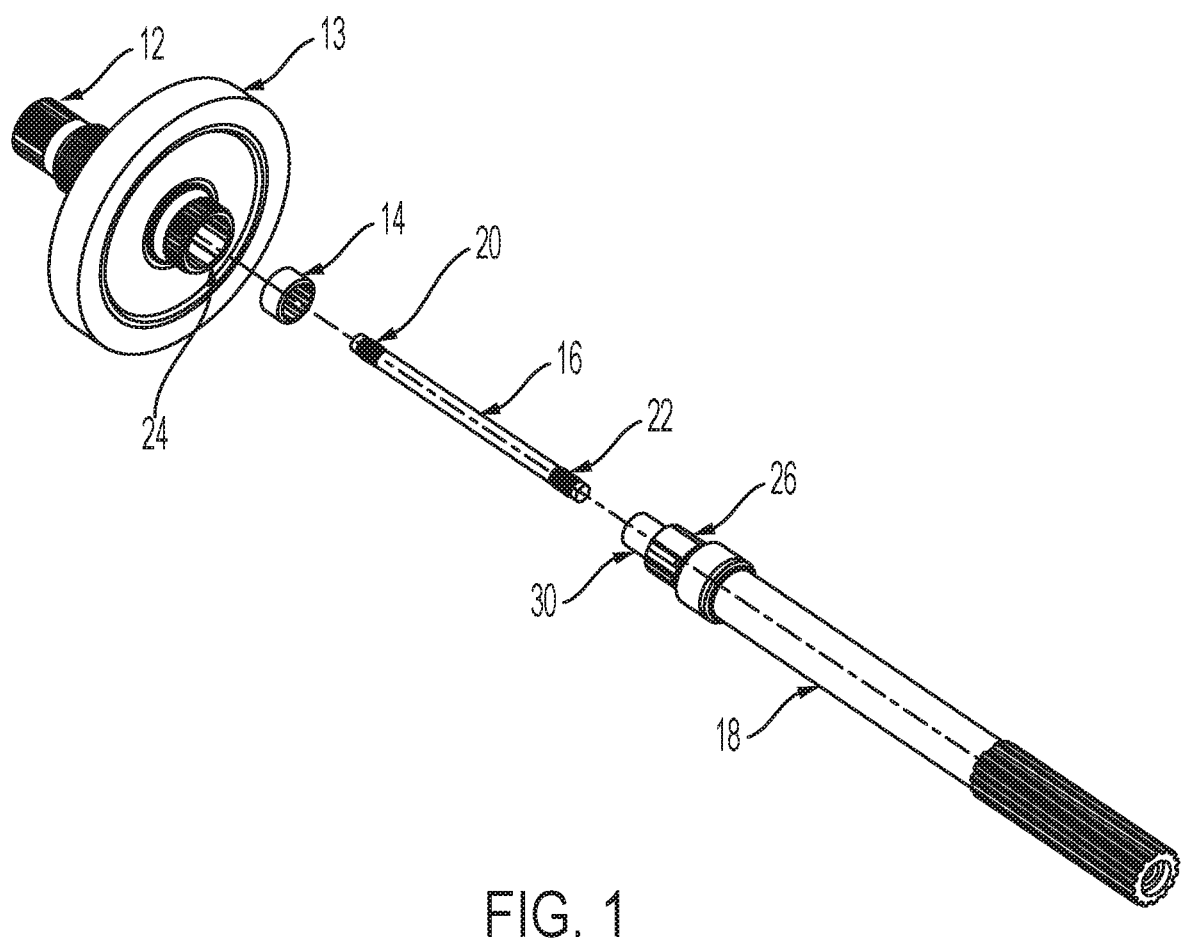
FIG. 1 is a perspective, disassembled view of an electric power steering (EPS) column assembly.
Figure 3:
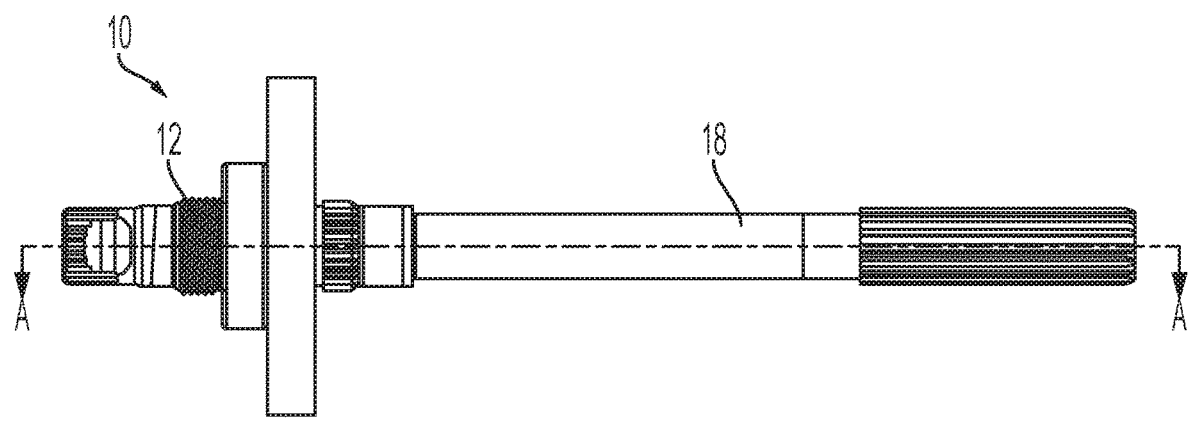
FIG. 3 is an elevational view of the EPS column assembly.
Figure 4:
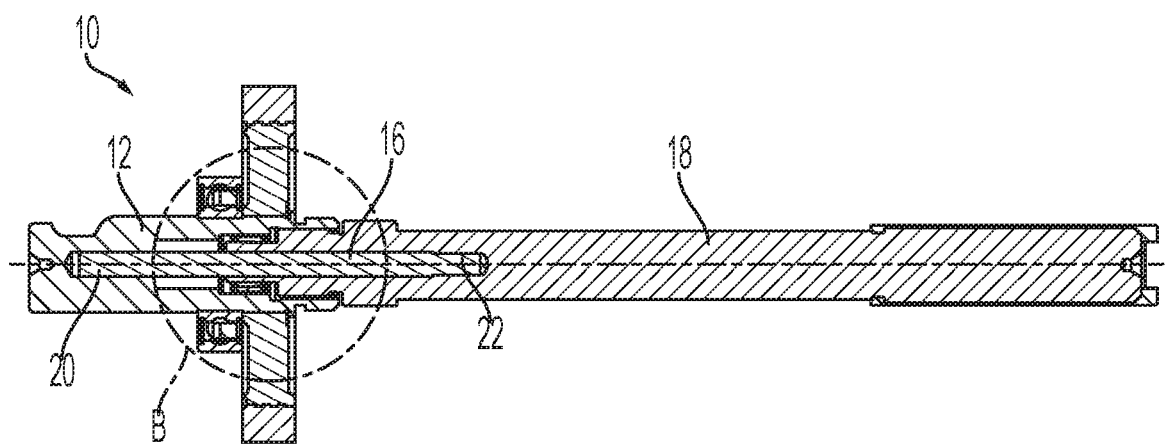
FIG. 4 is an elevational, cross-sectional view of the EPS column assembly taken along line A-A of FIG. 3.

FIGS. 1, 3 and 4 illustrate the EPS assembly 10, with FIG. 1 showing the assembly in a partially disassembled condition and FIGS. 3 and 4 showing the assembly in an assembled condition.

The EPS assembly 10 includes a lower assist shaft 12, a needle bearing 14, a torsion bar 16, and an upper assist shaft assembly 18. All of the above-mentioned components are held together—axially—by the interference fit between splined ends of the torsion bar 16 and respective interfaces within bores of the lower assist shaft 12 and the upper assist shaft assembly 18. In particular, a first end region 20 of the torsion bar 16 includes splines that engage splines within a bore of the lower assist shaft 12 in a press fit condition. Similarly, a second end region 22 of the torsion bar 16 includes splines that engage splines within a bore of the upper assist shaft assembly 18 in a press fit condition.

The lower assist shaft 12 transfers torque generated by a worm (not shown) and worm gear 13 to the intermediate steering shaft (not shown) that is connected to the lower assist shaft 12. The lower assist shaft 12 also supports and locates the needle bearing 14 and the first end region 20 of the torsion bar 16. Additionally, the lower assist shaft 12 incorporates stop teeth 24 that mate with stop teeth 26 on the upper assist shaft assembly 18.

The torsion bar 16 provides a restoring torque to center the upper assist shaft assembly 18 with the lower assist shaft 12 when there is no torque applied to the steering wheel through the upper assist shaft assembly 18. The stop teeth 26 in the upper assist shaft assembly 18 mate with the stop teeth 24 in the lower assist shaft 12 to provide an interface that limits the relative angular displacement between the upper assist shaft assembly 18 and the lower assist shaft 12. The needle bearing 14 is pressed into the lower assist shaft 12 to provide support to the upper assist shaft assembly 18 in the radial direction while minimizing friction in the angular direction between the upper assist shaft assembly 18 and the lower assist shaft 12.

The typical sequence of assembly of the EPS assembly 10 is to press the needle bearing 14 to a prescribed depth into the recessed bore located in the lower assist shaft 12. The torsion bar 16 is pressed to a prescribed depth into the mating bore that is recessed inside the upper assist shaft assembly 18. The exposed end of the torsion bar 16, together with the upper assist shaft assembly 18, is then pressed to a prescribed depth into the recessed hole in the lower assist shaft 12 that is sized for a press fit with the first end region 20 of the torsion bar 16.

Figure 2:
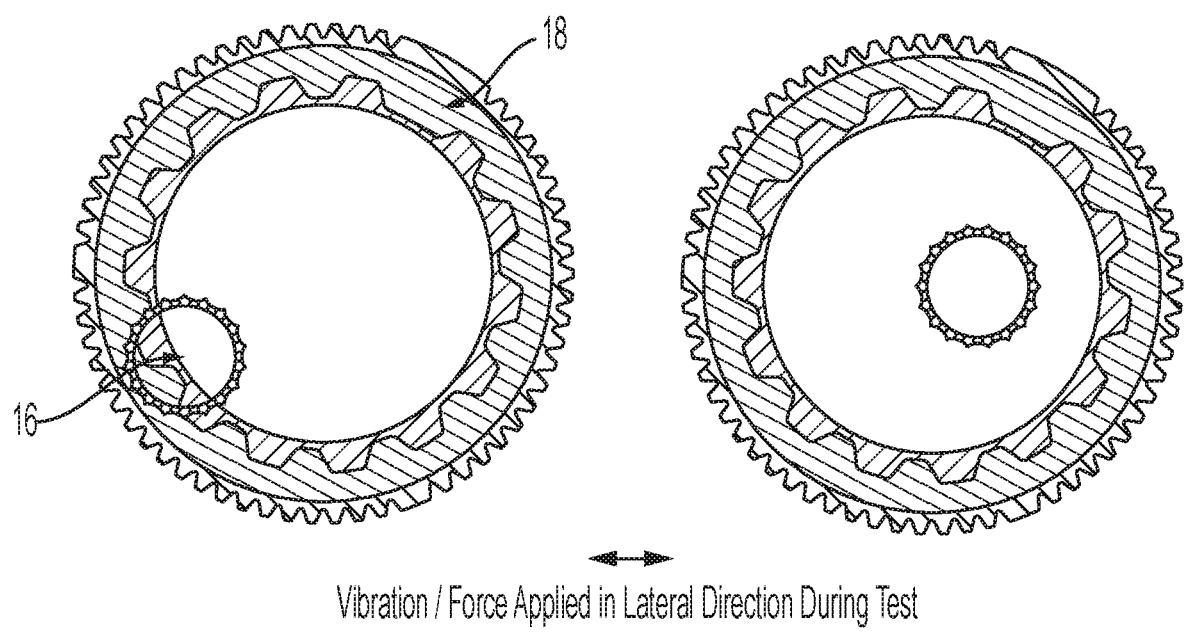
FIG. 2 is a cross-sectional view of the EPS column assembly comparing two run-out locations of a torsion bar.

The embodiments disclosed herein rely on a high clearance between the needle bearing 14 and an outer journal surface 30 that extends from the upper assist shaft assembly 18, as well as a high torsion bar run-out, when compared to columns with a high clearance and zero-to-low torsion bar run-out. FIG. 2 illustrates a high torsion bar run-out assembly (exaggerated for illustrative purposes) on the left and a low torsion bar run-out on the right for comparison. The increased torsion bar run-out acts as a spring that holds the journal surface 30 in contact with the needle bearing 14 despite there being excessive clearance between the journal surface 30 and the needle bearing 14. Since the journal surface 30 stays in contact with the needle bearing 14, the impact that would result from the journal surface 30 leaving and returning to the needle bearing 14 does not occur. Hence, the rattle noise resulting from the impact does not occur.

The embodiments of the EPS assembly 10 purposely introduce run-out in the torsion bar 16 to increase the force needed to hold the journal surface 30 against one or more surfaces on the needles in the needle bearing 14. As used herein, the term "run-out" refers to rotation inaccuracy that occurs when a portion of the torsion bar 16 is no longer aligned with the original, main longitudinal axis.

The above-described run-out can be introduced in different ways. For example, offsets between the two bores into which the torsion bar 16 is installed may be employed. Another example includes purposely laterally bending the torsion bar 16 before or after it is installed into one of the shafts 12 or 18, but prior to installing the free end into the mating shaft 12 or 18. Yet another example includes non-concentricity in one of the bores that the torsion bar 16 is to be inserted within. Another example includes intentional misalignment of the upper jacket that houses at least a portion of the EPS assembly 10. One of these examples, or a combination thereof, provides the sufficient torsion bar run-out that results in a force being applied between the journal surface 30 on the upper assist shaft assembly 18 and one or more needle surfaces inside the needle bearing 14 in the EPS assembly 10. As described herein, this force—if high enough—will prevent the journal surface 30 from leaving contact with the surface of one or more needles inside the needle bearing 14 during periods of vibration. If the journal surface 30 is held against one or more needle surfaces of the needles inside the needle bearing 14, then there can be no impact between the two surfaces when the journal surface 30 comes back into contact with the surface of one or more needles inside the needle bearing 14, thereby eliminating undesirable noise associated with rattle.

Figure 5:
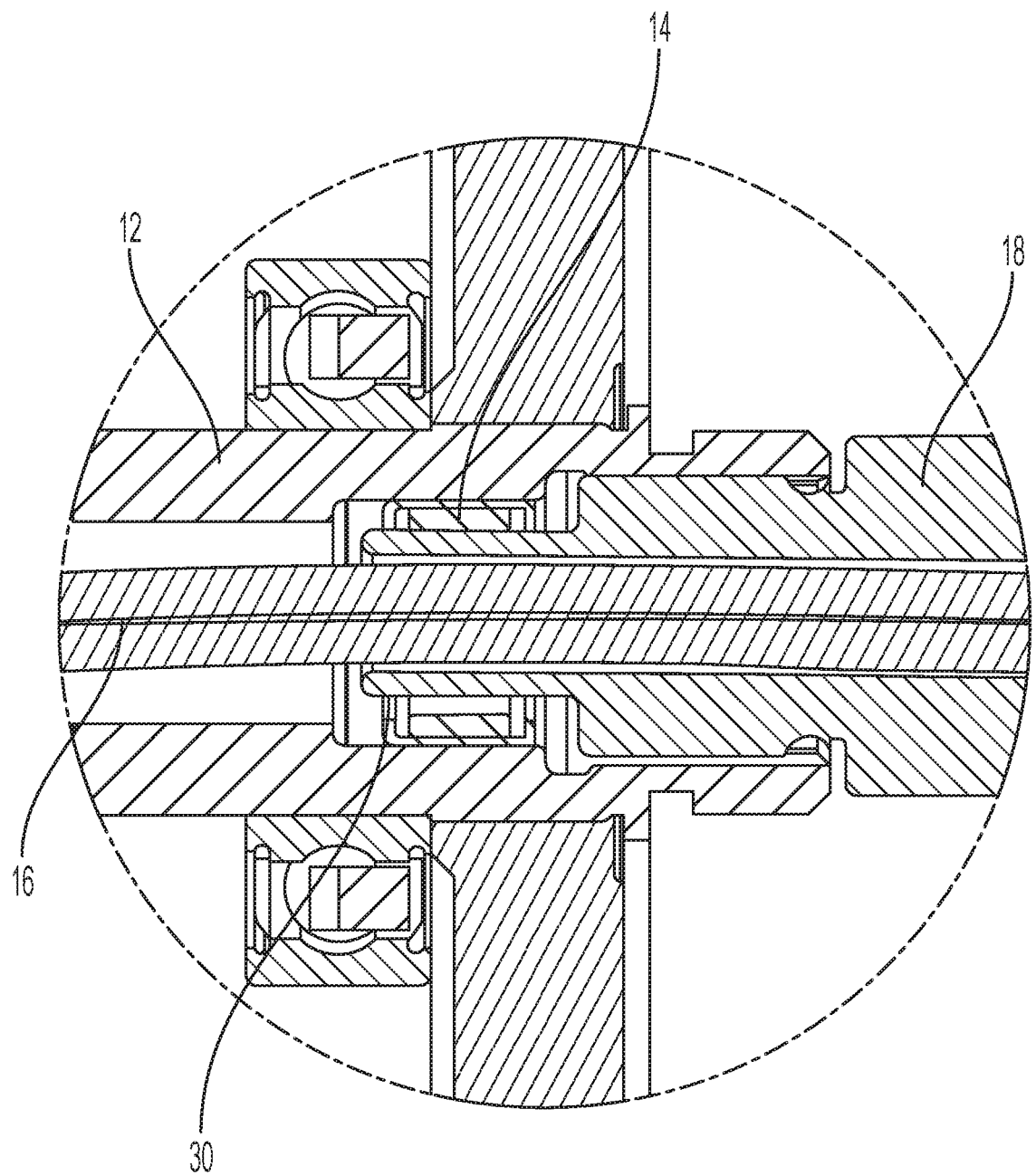
FIG. 5 is an enlarged view of Section B of FIG. 4.

FIG. 5 is an enlarged view of the portion of the torsion bar 16 located at an interface of the journal surface 30 of the upper assist shaft assembly 18 and the needle bearing 14 within the lower assist shaft assembly 12. The enlarged view of this interface illustrates a skewed portion of the torsion bar 16 and the bearing journal offset in the assembled condition of the overall assembly 10. As shown, a portion of the journal surface 30 is spaced from the needle bearing 14, while another portion of the journal surface 30 is forced into contact with the needle bearing 14. This is one manner in which the run-out can be provided to achieve the advantages described herein.

The EPS assembly 10 and method disclosed herein reduces or eliminates rattle noise and is a low-cost approach based on the utilization of existing components. The embodiments and have the potential to eliminate sticky grease and doesn't require zoning of parts needed to achieve low diametral clearance. Finally, no negative impact on torque sensor hysteresis results from the disclosed embodiments.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric power steering assembly for a steering column comprising:
   a lower assist shaft defining a first bore;
   a needle bearing at least partially disposed within the first bore;

an upper assist shaft assembly defining a second bore and having a journal surface at an end thereof; and a torsion bar having a first end disposed in the first bore and a second end disposed in the second bore, the torsion bar having a torsion bar run-out that forces the journal surface to remain in contact with an inner surface of the needle bearing.

2. The assembly of claim 1, wherein a portion of the torsion bar is bent to provide the torsion bar run-out.

3. The assembly of claim 1, wherein a first central axis of the first bore and a second central axis of the second bore are misaligned.

4. The assembly of claim 3, wherein the first central axis of the first bore and the second central axis of the second bore are parallel to each other and offset from each other.

5. The assembly of claim 3, wherein the first central axis of the first bore and the second central axis of the second bore are not parallel to each other.

6. The assembly of claim 3, wherein the first bore and the second bore are non-concentric.

7. A steering column assembly comprising:
a first shaft defining a first bore;
a second shaft defining a second bore, the second shaft having a journal surface at an end thereof, the first shaft and the second shaft in splined engagement with each other;
a bearing at least partially disposed within the first bore; and
a torsion bar having a first end and a second end, the first end disposed in the first bore and fixed therein in splined engagement, the second end disposed in the second bore and fixed therein in splined engagement, the torsion bar having a torsion bar run-out that forces the journal surface to remain in contact with an inner surface of the bearing.

8. The assembly of claim 7, wherein a portion of the torsion bar is bent to provide the torsion bar run-out.

9. The assembly of claim 7, wherein a first central axis of the first bore and a second central axis of the second bore are misaligned.

10. The assembly of claim 9, wherein the first central axis of the first bore and the second central axis of the second bore are parallel to each other and offset from each other.

11. The assembly of claim 9, wherein the first central axis of the first bore and the second central axis of the second bore are not parallel to each other.

12. The assembly of claim 9, wherein the first bore and the second bore are non-concentric.

13. A method of assembling an electric power steering assembly for a steering column, the method comprising:
inserting a needle bearing within a first bore of a lower assist shaft;

inserting a first end of a torsion bar into the first bore of the lower assist shaft;

inserting a second end of the torsion bar into a second bore of an upper assist shaft, the upper assist shaft having a journal surface located at an end thereof;

inserting the journal surface of the upper assist shaft into the first bore of the lower assist shaft and within an aperture of the needle bearing; and providing torsion bar run-out during rotation of the torsion bar that forces the journal surface to remain in contact with an inner surface of the needle bearing.

14. The method of claim 13, wherein providing the torsion bar run-out comprises bending a portion of the torsion bar.

15. The method of claim 13, wherein providing the torsion bar run-out comprises misaligning a first central axis of the first bore and a second central axis of the second bore.

16. The method of claim 15, wherein the first central axis of the first bore and the second central axis of the second bore are parallel to each other and offset from each other.

17. The method of claim 15, wherein the first central axis of the first bore and the second central axis of the second bore are not parallel to each other.

18. The method of claim 15, wherein the first bore and the second bore are non-concentric.

\* \* \* \* \*